(12) United States Patent
Paterson et al.

(10) Patent No.: US 6,259,379 B1
(45) Date of Patent: *Jul. 10, 2001

(54) AIR-GROUND LOGIC SYSTEM AND METHOD FOR ROTARY WING AIRCRAFT

(75) Inventors: Noel S. Paterson, Woodinville; Gary A. Ostrom, Bellevue; Alden L. Loos, Seattle, all of WA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,834

(22) Filed: Nov. 29, 1999

Related U.S. Application Data

(62) Division of application No. 08/846,962, filed on Apr. 29, 1997, now Pat. No. 6,043,759.
(60) Provisional application No. 60/022,081, filed on Jul. 29, 1996.

(51) Int. Cl.[7] .................................................. G08B 23/00
(52) U.S. Cl. ........................ 340/970; 73/178 T; 340/946; 340/963; 701/15
(58) Field of Search ........................ 340/959, 960, 340/969, 970, 977, 963, 946; 244/12.11; 701/9, 14, 15, 16

(56) References Cited

U.S. PATENT DOCUMENTS

| | | | | |
|---|---|---|---|---|
| 4,293,840 | * | 10/1981 | Hadari | 340/946 |
| 4,355,294 | * | 10/1982 | Ben-David et al. | 340/977 |
| 4,987,413 | * | 1/1991 | Grove | 340/970 |
| 5,666,110 | * | 9/1997 | Paterson | 340/946 |
| 5,826,833 | * | 10/1998 | Evans et al. | 340/959 |

* cited by examiner

*Primary Examiner*—Brent A. Swarthout

(57) ABSTRACT

The present invention provides ground proximity warning system and method for aircraft, particularly rotary wing aircraft such as helicopters. The warning system generally includes an air ground detection device disposed on the aircraft to confirm whether the aircraft is on the ground or in the air. A controller is coupled to the air ground detection device and configured to move between a ground state when the aircraft is on the ground and an airborne state when the aircraft is in the air. The controller may be used for a variety of applications within the aircraft, such as disabling a ground proximity warning device when the aircraft is on the ground and enabling the warning device when the aircraft is in the air. In addition, the air ground controller may be used to signal the beginning and the end of a flight for the aircraft's flight history fault memory.

7 Claims, 7 Drawing Sheets

AIR-GROUND LOGIC SYSTEM AND METHOD FOR ROTARY WING AIRCRAFT

CROSS REFERENCE TO RELATED APPLICATIONS

This application claims priority from U.S. provisional application Ser. No. 60/022,081 filed Jul. 29, 1996, and is a divisional of application Ser. No. 08/846,962 filed Apr. 29, 1997, now U.S. Pat. No. 6,043,759.

This application is related to concurrently filed and commonly assigned patent applications entitled "Ground Proximity Warning System and Methods for Rotary Wing Aircraft" (Attorney Docket No. 543-96-007/T-S-004), and "Systems and Methods for Generating Altitude Callouts for Rotary Wing Aircraft" (Attorney Docket No. 543-96-008/T-S-006), the complete disclosures of which are incorporated herein by reference.

BACKGROUND OF THE INVENTION

The present invention relates generally to ground proximity warning devices and more particularly to systems and methods for enabling such ground proximity warning devices in rotary wing aircraft.

Ground proximity warning systems provide aural and visual warnings of aircraft descent after takeoffs, landings, during a go-around after a missed approach and other low altitude flying conditions. These systems typically detect altitude loss by computing the barometric altitude (MSL) rate change. The radio altitude or altitude above ground level (AGL) is then determined with a radio altimeter. The warning device typically issues a number of aural or visual warnings if the altitude loss is excessive for the radio altitude at which the aircraft is flying. For example, one such system, compares the accumulated altitude loss after takeoff of the aircraft, and generates a warning if the altitude loss exceeds a predetermined value before a threshold altitude has been reached. Examples of such a system are disclosed in commonly assigned U.S. Pat. Nos. 3,946,358, 3,947,808 and 4,818,992, the complete disclosures of which are incorporated herein by reference. Another type of warning system warns the pilot in the event that the aircraft if descending too rapidly, particularly on approach to a landing. Examples of this type of warning system are disclosed in commonly assigned U.S. Pat. Nos. 3,958,358 4,215,334 and 4,551,723, the complete disclosures of which are also incorporated herein by reference.

The present invention is particularly concerned with ground proximity warning devices for rotary wing aircraft, such as helicopters. Most conventional ground proximity warning systems are designed to operate with transport aircraft, particularly with large turbine powered aircraft, such as those flown by commercial airlines. Since rotary wing aircraft are highly maneuverable, they typically have flight operational characteristics entirely different than that of transport aircraft. Consequently, the systems designed for transport aircraft can generate nuisance warnings during certain normal operational conditions in rotary wing aircraft. In addition, these warning systems may provide no warning or an inadequate warning during other flight conditions. Thus, a pilot may tend to ignore the warnings provided by such systems, rendering them ineffective.

SUMMARY OF THE INVENTION

The present invention provides ground proximity warning systems and methods for rotary wing aircraft such as helicopters. The warning system of the present invention includes an air ground detection device disposed on the aircraft to confirm whether the aircraft is on the ground or in the air. A controller is coupled to the air ground detection device and configured to move between a ground state when the aircraft is on the ground and an airborne state when the aircraft is in the air. The controller may be used for a variety of applications within the aircraft, such as disabling a ground proximity warning device when the aircraft is on the ground and enabling the warning device when the aircraft is in the air. In addition, the air ground controller may be used to signal the beginning and the end of a flight for the aircraft's flight history fault memory. For example, when the controller switches from the ground state to the airborne state, the warning may include a switch for enabling the flight history fault memory. When the control switches back to the ground state, the switch will disable the flight history flight memory to signify the end of the flight.

In a specific configuration, the warning system includes one or more sensors for sensing certain aircraft conditions that will indicate whether the aircraft is on the ground or in the air. Preferably, the sensors include one or more force sensors placed on or near the aircraft's wheel to detect the weight placed thereon. When the weight is above a threshold level that indicates the aircraft's weight is being placed on the wheels, the controller will switch into the ground state. When the weight falls below the threshold level, the controller will switch back to the airborne state indicating that the aircraft has taken off. The control system further includes a latch that holds the controller in either the airborne or ground state until it is reset by one or more flight conditions. For example, prior to takeoff, the latch will hold the controller in the ground state. The latch will not reset and allow the controller to move into the airborne state until the force sensor(s) detect an aircraft weight greater than the threshold weight.

The weight sensors are typically placed exterior to the aircraft and, therefore, are subject to environmental conditions such as adverse weather and the like. Accordingly, the invention may include an additional, redundant detection method to prevent erroneous airborne indication due to errors in the weight sensors. In an exemplary embodiment, the system further includes one or more engine torque detectors for detecting the total engine torque of one or more of the aircraft's engines. In this embodiment, the controller will move into the ground state when the weight on the wheels is above the threshold level and when the engine torque is below a threshold level, which would indicate that the aircraft is not providing enough torque to lift the helicopter above the ground.

In an exemplary embodiment, a ground proximity warning computer is provided for a rotary wing aircraft, e.g., a Sikorsky S-76 Aircraft. The warning computer provides warnings to the pilot when the aircraft is in danger of impacting the earth. The aircraft data is collected from various sensors on the aircraft and processed in a digitally controlled warning computer to determine if the aircraft is in danger. Visual and aural outputs advise the pilot of dangerous situations and indicate if the system is operational. According to the present invention, the warning computer includes a ground proximity warning device having an alarm for generating a visual and/or aural warning based on one or more flight condition(s) of the aircraft. This ground proximity warning device can provide a variety of warnings to the pilot(s), such as excessive descent rate, excessive closure to terrain, altitude loss after take-off, unsafe terrain clearance, altitude awareness callouts and the like.

The controller of the present invention is coupled to one or more of the warning devices and disposed to disable the warning devices when the aircraft is on the ground. Consequently, the warning devices will generate less nuisance warnings during certain normal operational conditions of the rotary wing aircraft so that the pilot will not be tempted to ignore the warnings provided by such systems.

DETAILED DESCRIPTION OF THE SPECIFIC EMBODIMENTS

Figure 1:
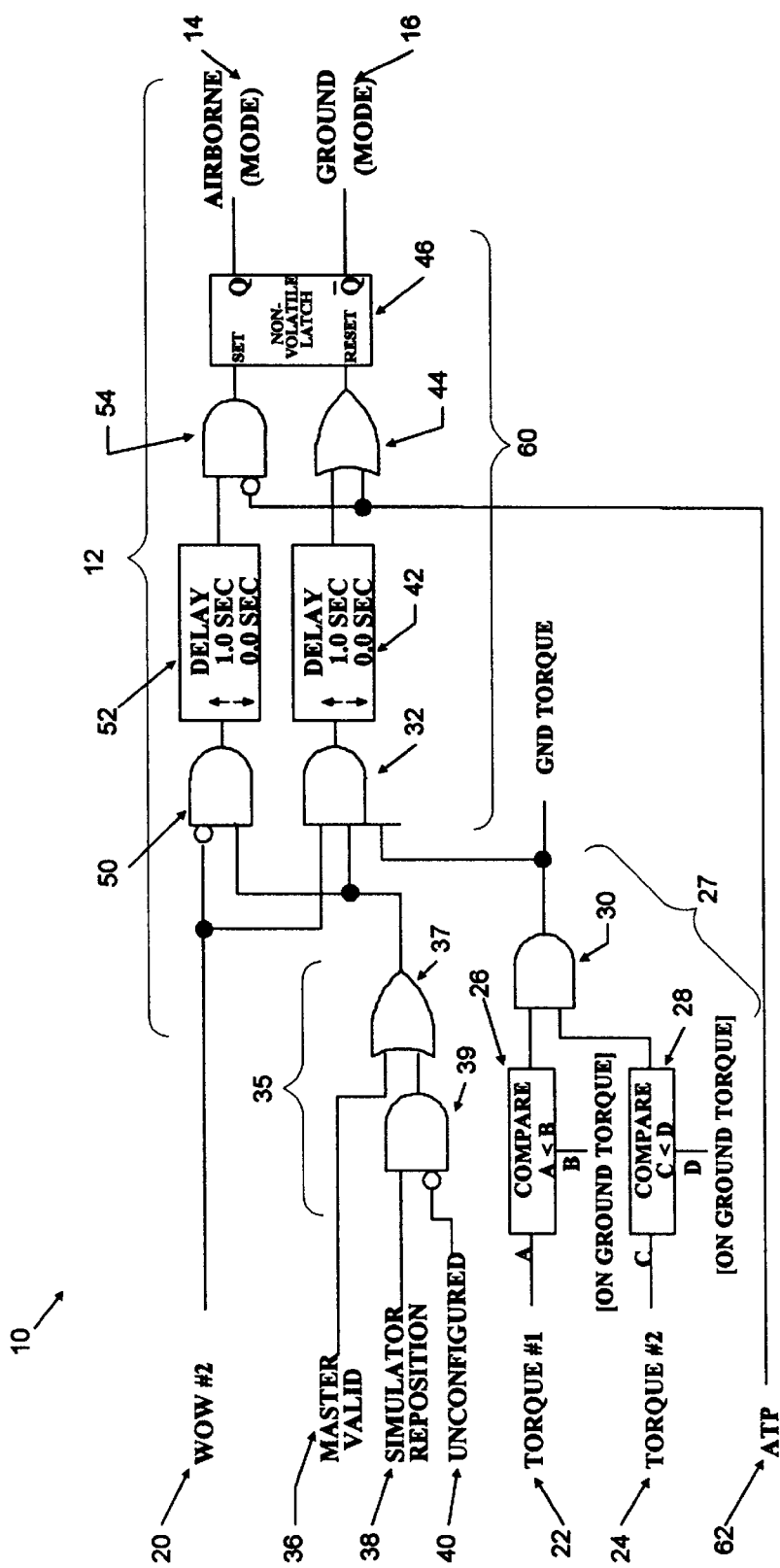
FIG. 1 is a functional block diagram of an air-ground logic controller according to the present invention.

Referring to the drawings in detail, wherein like numerals indicate like elements, an air-ground control system 10 for confirming whether a rotary wing aircraft is on the ground or in the air is illustrated in FIG. 1. FIGS. 2–7 illustrate representative warning system and decision height advisory systems incorporating the air-ground control system of FIG. 1. The air-ground control system 10 and the warning systems according to the invention are illustrated in a logical block diagrams as a series of gates, comparators and the like for purposes of illustration. However, it should be understood that the actual implementation of the logic can be other than as shown in the drawings, with various digital and analog implementations being possible. Alternatively, the implementation of the logic may be carried out by the computer readable code of software programs. The signals used by the system as described include radio altitude, barometric altitude rate and airspeed, along with various validity signals. Depending on the type of aircraft in which the warning system is installed, the signals shown in the figures can be obtained from individual instruments, such as a barometric altimeter, a barometric rate circuit, a radio altimeter and an airspeed detector, which may be an air data computer or an airspeed indicator, and other discrete elements indicating whether the landing gear is up or down, etc. Alternatively, the signals can be obtained from a digital data bus in certain newer aircraft.

In an exemplary embodiment, control system 10 will form a portion of a larger Ground Proximity Warning System (GPWS) which provides warnings to the pilot when the aircraft is in danger of impacting the earth. The aircraft data is collected from various sensors on the aircraft and processed in a digitally controlled warning computer to determine if the aircraft is in danger. Visual and aural outputs advise the pilot of dangerous situations and indicate if the system is operational. One such warning computer is the AlliedSignal MKVII Warning Computer for a rotary wing aircraft, which is commercially available from AlliedSignal Avionics Inc., Redmond, Wash.

The GPWS preferably includes a number of warning modes to provide aural and visual alerts and warnings for unsafe proximity to terrain, deviation below ILS glide slope, excessive bank angle, onset of severe wind shear, altitude awareness, etc. Mode one, for example, provides pilots with alert/warnings for high descent rates into terrain. In this mode, a warning device compares the altitude above ground of the aircraft with the descent rate, preferably barometric descent rate, and issues a warning if the descent rate is excessive for the altitude at which the aircraft is flying. A more complete description of an exemplary warning device for indicating excessive descent rate can be found in U.S. Pat. No. 4,551,723, the complete disclosure of which has previously been incorporated herein by reference. Mode two provides warnings for excessive closure rates to terrain with respect to altitude (AGL), phase of flight and speed. Mode three provides warnings for significant altitude loss after takeoff or low altitude go around. A complete description of this system can be found in U.S. Pat. No. 4,818,992, the complete disclosure of which has previously been incorporated herein by reference.

As discussed below with reference to FIGS. 2 and 3, mode 4 provides alerts and warnings for insufficient terrain clearance with respect to phase of flight and speed. Mode 5 provides glide slope alerts when the airplane is below 1,000 ft. AGL with the gear down and the glide slope deviation exceeds a threshold number of dots below the ILS glide slope. As discussed below with reference to FIGS. 4–7, mode six provides callouts for descent through predefined altitudes (AGL). In particular, mode six is utilized during autorotation when the aircraft has lost all or partial engine power.

Referring to FIG. 1, control system 10 includes a controller 12 that receives input from a number of sensors to determine whether the control system 10 is in an airborne state 14 or a ground state 16. In the exemplary embodiment, a pair of AND gates 32 and 50 receive inputs from a weight on wheel device 20 ("WOW"), a validity circuit 35 and an engine torque circuit 27 to set or reset a latch 46 that determines whether controller 12 is in the airborne state 14 or ground state 16. WOW device 20 includes a force sensor (not shown) preferably located on or near the aircraft's wheel for detecting the weight placed on the wheel by the aircraft and a comparator or similar element (not shown) for determining whether the aircraft weight is above or below a threshold level. The threshold level will usually be set at a level that indicates that an aircraft is on the ground, which will vary depending on the weight of the aircraft. Engine torque circuit 27 includes a pair of engine torque sensors 22, 24 placed on each engine to detect the torque being generated by the engines, and to input these values A,C into comparators 26, 28, respectively. Comparators 26, 28 compare the inputs of torque sensors 22, 24 with a reference torque B, D for each engine which indicates that the aircraft must be on the ground. Typical values for On Ground Torque are about 30%, but the values may vary from about 20% to about 40%. If engine torques A, C are less than on ground torque values B, D, respectively, comparators 26, 28 input a true value to an AND gate 30. In addition, the invention may be employed with only one torque sensor on one of the engines or engine.

Controller 12 includes a validity circuit 35 for confirming that certain aspects of the warning computer are operational. Validity circuit 35 preferably receives inputs from a master valid input 36, a simulator reposition input 38 and an unconfigured input 40. As shown, if the aircraft is configured and the simulator is repositioning, or if master valid is true, a positive or true input will be applied from an OR gate 37 to AND gates 32 and 50. If the system master valid is false and the simulator position is inactive, the state of the latch is prevented from changing.

As shown in FIG. 1, AND gate 32 receives inputs from validity circuit 35, WOW device 20 and gate 30 of torque engine circuit 27. Thus, if: (1) the WOW device 20 indicates that the weight on the wheel is above a threshold level; (2) the validity circuit 35 is true; and (3) both engine torque values A, C are less than the on ground torque values B, D, AND gate 32 will apply a positive output to a latch circuit 60. Controller 12 includes another AND gate 50 which receives input from WOW device 20 and validity circuit 35. If the WOW device 20 indicates that the weight on the aircraft's wheels is equal to or below a threshold level and the validity circuit is true, AND gate 50 will apply a positive output to latch circuit 60.

Latch circuit 60 includes latch 46, an AND gate 54, an OR gate 44 and a pair of delay mechanisms 42, 52. As shown, the outputs of AND gates 32, 50 are delayed by delay mechanisms 42, 52, respectively, to minimize switch chattering and debouncing, usually between about 0 to 1 seconds. The signal from AND gate 32 is then applied to OR gate 44 along with an ATP signal 62 that indicates that ATP mode is in effect. The ATP input is a signal for driving the latch to the ground state during acceptance testing. If the aircraft is in ATP mode, or AND gate is positive 32, a signal is applied to latch 46 to reset controller 12 to the ground state 16. Similarly, AND gate 54 receives input from the ATP signal 62 and gate 50. Thus, if the aircraft is not in the ATP mode, the WOW sensor 20 indicates that the weight on the aircraft's wheels is equal to or below a threshold level and the validity circuit 27 is true, latch 46 is set to the airborne state 14.

When the aircraft is on the ground, latch 46 will maintain controller 12 in ground state 16. At this point, the weight on wheel signal 20 is true indicating that the weight is above the threshold level and the output from AND gate 30 is true indicating that the engine torques A, C are both below the ground reference torques B, D, respectively. When the aircraft takes off, the weight on the wheels suddenly decreases, which causes WOW signal 20 to inhibit AND gate 32. If the validity circuit 27 is positive (i.e., the master valid input 36 is true or the simulator is repositioned and the aircraft is configured), the latch 46 will be reset into the airborne state 14. The state of latch 46 is preferably maintained in a nonvolatile memory to prevent inadvertent change of state during loss of computer power.

The normal latch logic is only enabled when master valid 36 is true. However, when repositioning, latch 46 is allowed to follow the new data values once filters have been released (i.e., not unconfigured). Ground state is also imposed whenever ATP mode is in effect, regardless of any other data.

Figure 2:
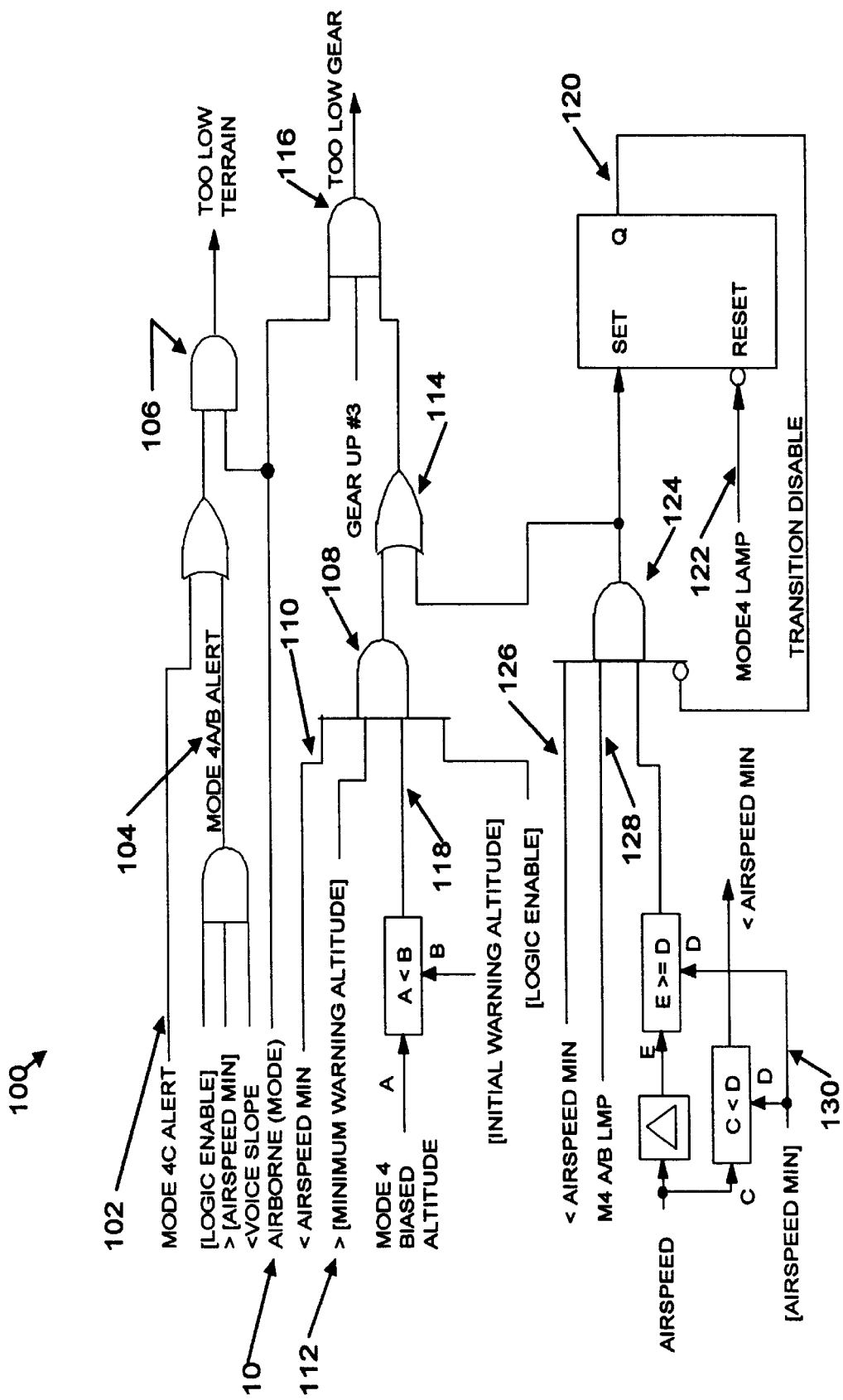
FIG. 2 illustrates a representative ground proximity warning system incorporating the air-ground logic controller of FIG. 1.

FIG. 2 illustrates the envelope or voice message logic for a mode 4 warning system that incorporates the air ground control system 10 shown in FIG. 1. As discussed above, mode 4 warns pilots of insufficient terrain clearance during climb out cruise initial descent or approach. This warning mode is especially valuable when the aircraft's flight path relative to terrain is insufficient to develop excessive closure rate or descent rate warnings. Preferably, the warning envelope on approach gradually collapses as speed decreases, the landing gear is lowered and the flaps selected. The wording of the warning is often changed to correlate with the phase of flight and the actual cause of alarm. Speed will automatically expand the warning envelope providing precious additional warning time for the pilot. In the event of full or partial flap landings, a cockpit guarded flap override switch may be provided to eliminate possible nuisance alarms.

Referring to FIG. 2, warning system 100 receives input from a mode 4C alert 102 and a mode 4A/B alert 104. Mode 4A is generally active during cruising and approach with the landing gear not in landing configuration while mode 4B is active during cruise and approach with the landing gear in the landing configuration. Mode 4C is active after take-off or low altitude go-around with the landing gear not in a landing configuration. If system 100 receives either one of these alerts 102, 104, a positive signal is input into an AND gate 106. If the aircraft is in an airborne state (as discussed above in reference to FIG. 1), AND gate 106 will enable the warning "TOO LOW, TERRAIN". This message will generally only be repeated twice unless terrain clearance continues to decrease. For mode 4A or mode 4B, this message will only be enabled if the air speed is higher than a minimum reference value.

As shown in FIG. 2, an AND gate 108 receives the air speed and minimum warning altitude inputs 110, 112. In addition, if the mode 4 biased altitude is less than an initial warning altitude, AND gate 108 will send a positive signal to an OR gate 114. In this case, if the landing gears are up, and the air-ground controller 10 is in the airborne state, the system will enable an oral message "TOO LOW, GEAR".

Figure 3:
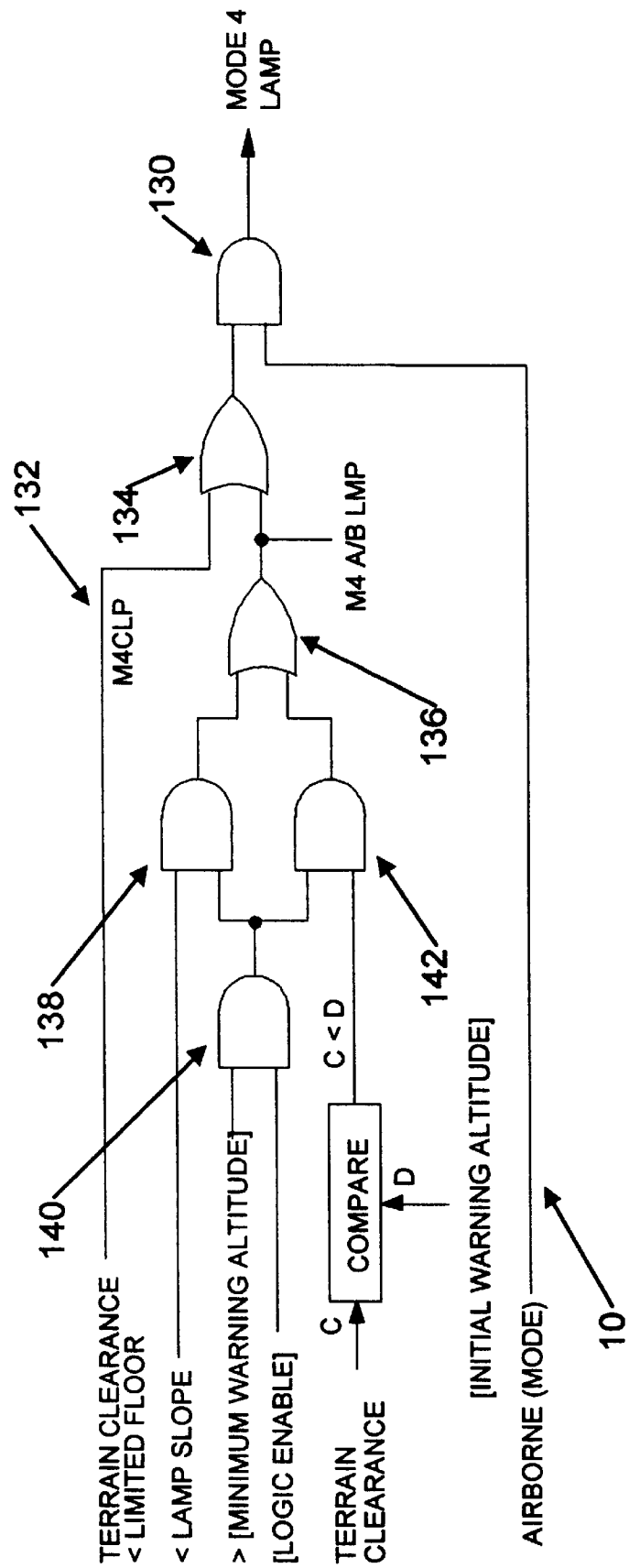
FIG. 3 illustrates a lamp block logic system incorporating the air-ground logic controller of FIG. 1.

Warning system 100 further includes a latch 120 that is reset by a mode 4 pullup lamp 122 (See FIG. 3). Latch 120 is set when it is enabled by an AND gate 124 having inputs from a minimum airspeed check 126, a mode 4A/B lamp input 128, and an airspeed circuit 130. Thus, if the aircraft's airspeed is below a minimum value, the mode 4A/B lamp is set and the aircraft's airspeed is greater than a second minimum value, the latch 120 will be set. In addition, AND gate 124 enables OR gate 114 such that AND gate 116 enables the "TOO LOW GEAR" aural warning if the aircraft is in the airborne state and if the landing gears are up.

Referring to FIG. 3, the preferred logic for a mode 4 pullup lamp warning is illustrated. As shown, the mode 4 pullup lamp will be activated (and latch 120 reset, see FIG. 2) if it is enabled by an AND gate 130 which receives input from the air-ground controller 10 of FIG. 1 and a terrain clearance circuit 132. Terrain clearance circuit 132 includes an OR gate 134 which enables AND gate 130 if the terrain clearance is less than a limited floor value. Alternatively, if the aircraft's change in altitude is less than a lamp slope value and the aircraft is flying at an altitude greater than a minimum warning altitude, an OR gate 136 will be enabled by AND gates 138, 140. Alternatively, if the terrain clearance is less than an initial warning altitude and the altitude is greater than a minimum warning altitude, OR gate 136 will be enabled by AND gates 142, 140. In any of these instances, the mode 4 pullup lamp will be activated to reset latch 120 (FIG. 2).

Figure 4:
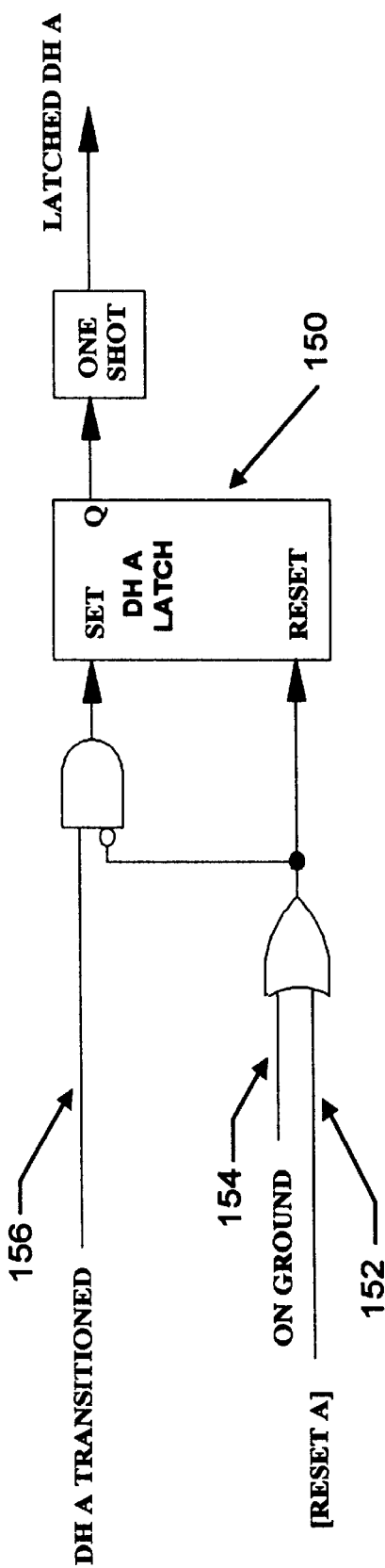
FIGS. 4–6 illustrate a decision height advisory callout system incorporating the air-ground logic controller of FIG. 1.
Figure 5:
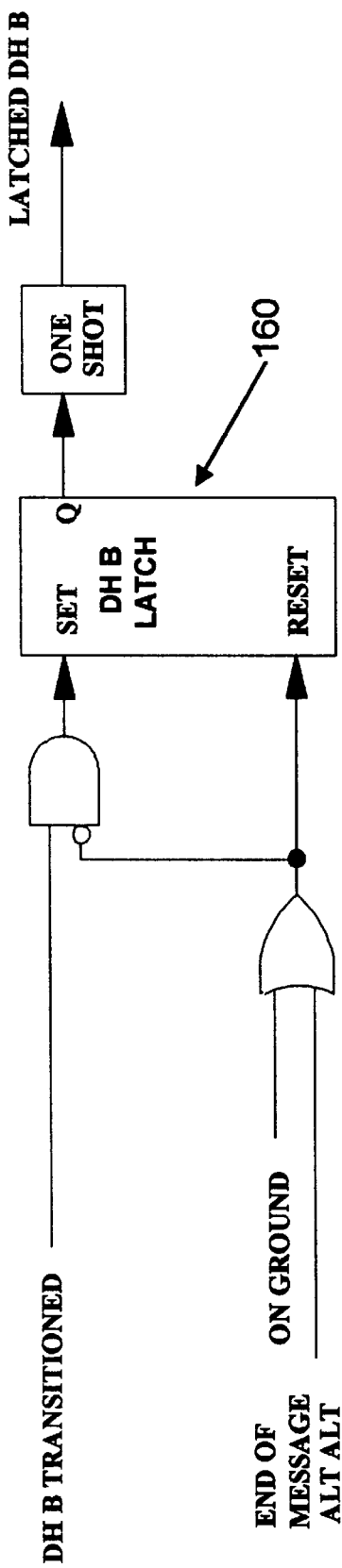
Figure 6:
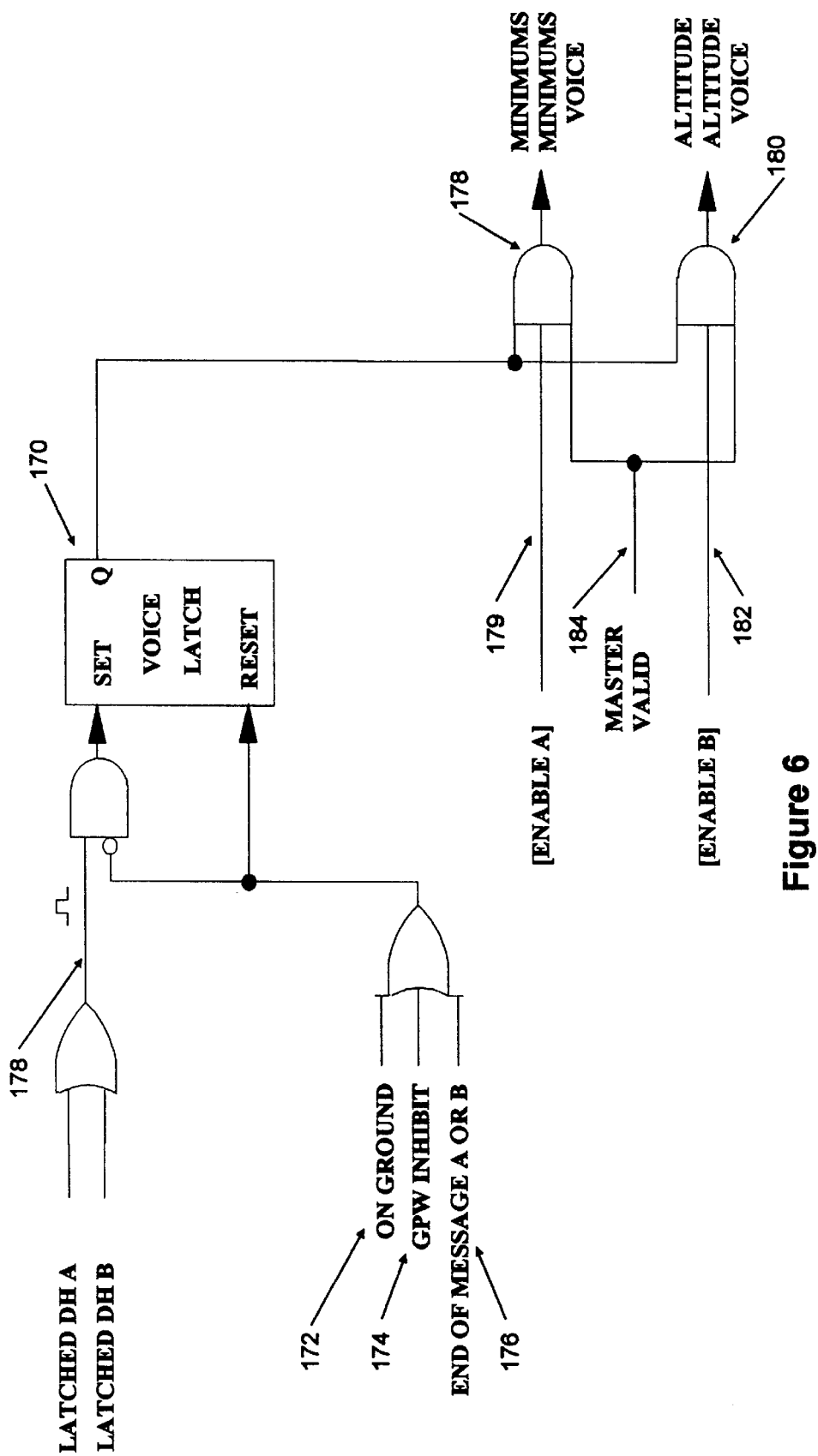

FIGS. 4–6 illustrate a decision height advisory callout system that may be used in conjunction with the air/ground controller 10 of FIG. 1. This logic will be used in mode 6, which provides callouts for descent through predefined altitudes (AGL) including descent to decision heights. The mode 6 callout function is typically active during the final approach phase of flight. As shown in FIG. 4, the logic includes a decision height A latch 150 that may be reset manually by the pilot 152, or if the air-ground controller 10 of FIG. 1 indicates a ground state 154. Similarly, the latch 150 is set if the decision height A 156 is transitioned by the aircraft, and if the aircraft is not on the ground (i.e., in the airborne state).

FIG. 5 illustrates a similar logic diagram for the decision height B. As shown, a latch 160 is reset if the aircraft is in the ground state, or if the decision height message has already been completed. Similarly, the latch 152 is set when decision height B is transitioned and the aircraft is in the airborne state.

Referring to FIG. 6, the voice logic for mode 6 includes a voice latch 170 that is reset when the aircraft is in the ground state 172, the ground proximity warning is inhibited 174, or decision height messages A or B have ended 176. Voice latch 170 is set if: (1) either decision height A or B have been latched 178 (as discussed in FIGS. 4 and 5); (2) the aircraft is not on the ground; (3) the ground proximity warning has not been inhibited; and (4) the decision height messages have not ended. As shown, a first AND gate 178 enables the "minimums minimums" message if the latch is set, the enable A logic (not shown) is positive and the master is valid. Similarly, a second AND gate 180 enables the "altitude altitude" message if the latch is set, the enable B circuit 182 is positive and the master is valid 184.

Figure 7:
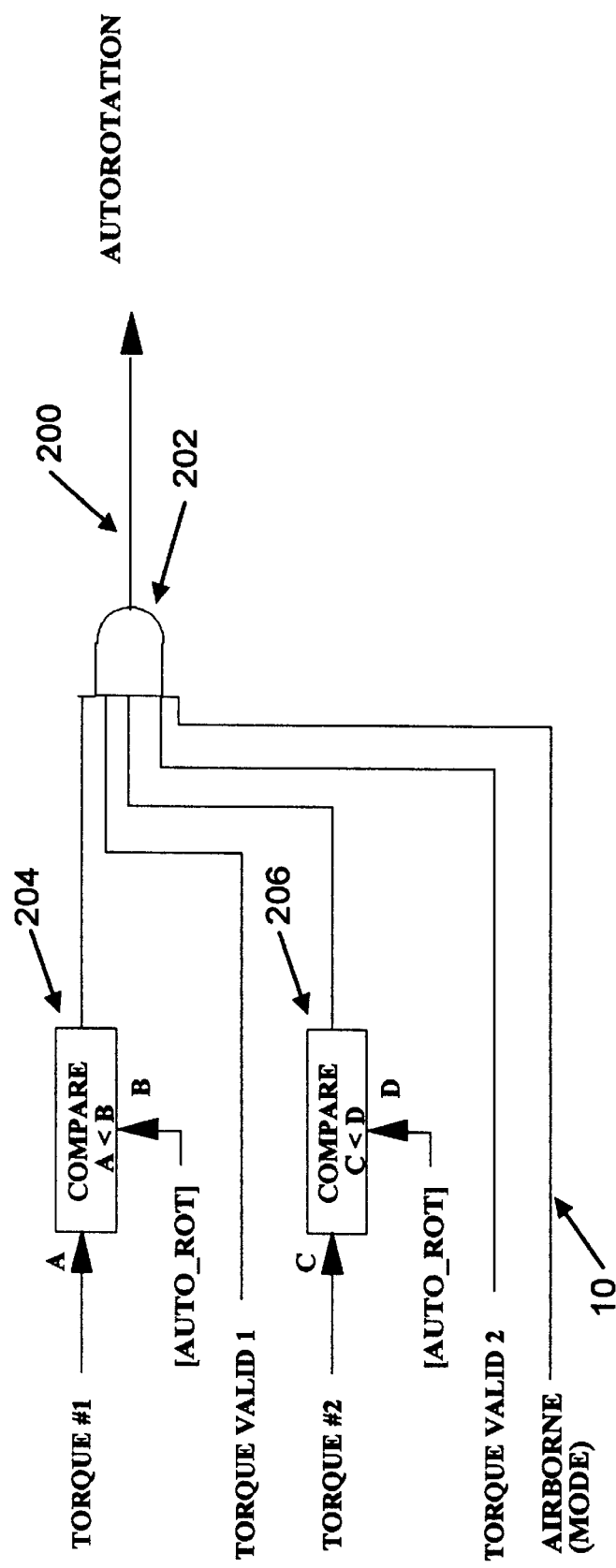
FIG. 7 illustrates an auto rotation detection system according to the present invention.

Referring to FIG. 7, an auto rotation detection system 200 is illustrated according to the present invention. Auto rotation typically occurs when a helicopter suffers an engine failure, and the rotors continue to rotate due to the velocity of the helicopter through the air. This auto rotation provides enough lift to the helicopter to allow the pilot to maneuver the helicopter down to the ground at a reasonably controlled rate although substantially faster than the normal descent rate. As shown in FIG. 7, the auto rotation detection system is activated or enabled by an AND gate 202 that receives input from engine torque indicators and the air-ground controller 10 of FIG. 1. Specifically, the engine torques of engine number 1 and engine number 2 are each compared to a reference auto rotation torque value with comparators 204, 206. If both engine torques are lower than the reference auto rotation torque values, the aircraft must be in auto rotation if it is airborne. Accordingly, if: (1) both torque values are below the reference value; (2)the torque serial buses for each engine torque sensor are valid; and (3) if the airplane is in the airborne state, AND gate 202 enables the auto rotation warning.

What is claimed is:

1. A ground proximity warning system for rotary wing aircraft comprising:

a sensor disposed on the aircraft to detect a flight condition;

a warning computer having an input connected to the sensor, the warning computer including a controller coupled to the input for generating a signal representing the flight condition and a warning device coupled to the controller for receiving the signals and generating an aural warning to the pilot indicating the flight condition; and an air-ground detector wherein the air-ground detector comprises an engine torque detector disposed to detect the torque of one or more of the aircraft's engines, wherein the condition when the torque is below one of an on ground torque or an autorotation torque is a sufficient condition for causing the controller to move into a ground state whereby said air-ground detector is disposed to detect whether the aircraft is on the ground or in the air, the air-ground detector being coupled to the warning computer and disposed to disable the controller or the warning device when the aircraft is on the ground.

2. The warning system of claim 1 wherein the air-ground detector enables the warning computer when the aircraft is in the air.

3. The warning system of claim 1 wherein the air-ground detector comprises a force sensor positioned on or near the aircraft's wheel for detecting the weight placed on the wheel, wherein the controller moves into the ground state when the sensor detects a threshold weight.

4. The warning system of claim 1 wherein the sensor is an altitude detector disposed to detect the altitude of the aircraft, the controller is coupled to said detector and disposed to generate signals representative of the altitude of the aircraft, and the warning device is coupled to the controller for receiving the signals and generating an aural warning to the pilot indicating the altitude.

5. A method for warning a pilot of a flight condition in a rotary wing aircraft, the method comprising:

sensing a weight placed on the aircraft's wheel;

determining a torque of the aircraft's engine;

determining whether the aircraft is in the air or on the ground based on said weight; and torque;

if the aircraft is in the air, generating a warning to the pilot based on one or more flight conditions and wherein the warning is generated only when both the torque is above an on-ground torque and an autorotation torque and the weight is below a threshold weight, in order to avoid a nuisance warning when the aircraft is on the ground or under an engine failure condition.

6. The method of claim 5 further comprising comparing said weight to a threshold weight to determine whether the aircraft is in the air.

7. The method of claim 5 further comprising:

detecting the radio altitude of the rotary wing aircraft;

determining whether the radio altitude is one of a plurality of preselected altitude callouts;

generating signals representative of the radio altitude if the radio altitude is one of said plurality of preselected altitude callouts; and if the aircraft is in the air, issuing an aural warning to the pilot indicating the radio altitude of the aircraft.

* * * * *